United States Patent
Liu et al.

(10) Patent No.: US 9,336,168 B2
(45) Date of Patent: *May 10, 2016

(54) ENHANCED I/O PERFORMANCE IN A MULTI-PROCESSOR SYSTEM VIA INTERRUPT AFFINITY SCHEMES

(71) Applicant: Avago Technologies General IP (Singapore) Pte., Singapore (SG)

(72) Inventors: Qiang Liu, Irvine, CA (US); Allen Russell Andrews, El Cajon, CA (US); David Bradley Baldwin, Irvine, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 14/866,262

(22) Filed: Sep. 25, 2015

(65) Prior Publication Data

US 2016/0011997 A1    Jan. 14, 2016

Related U.S. Application Data

(63) Continuation of application No. 14/087,953, filed on Nov. 22, 2013, now Pat. No. 9,183,167, which is a continuation of application No. 12/577,031, filed on Oct. 9, 2009, now Pat. No. 8,635,387.

(51) Int. Cl.
*G06F 3/00* (2006.01)
*G06F 13/24* (2006.01)
*G06F 13/32* (2006.01)
*G06F 3/06* (2006.01)
*G06F 9/48* (2006.01)
*G06F 9/50* (2006.01)

(52) U.S. Cl.
CPC ............... *G06F 13/32* (2013.01); *G06F 3/061* (2013.01); *G06F 3/067* (2013.01); *G06F 3/0632* (2013.01); *G06F 9/4812* (2013.01); *G06F 9/5033* (2013.01); *G06F 13/24* (2013.01)

(58) Field of Classification Search
CPC .............................. G06F 13/24; G06F 9/4812
USPC ......................................................... 710/48
See application file for complete search history.

(56) References Cited

U.S. PATENT DOCUMENTS 7,610,425 B2 *  10/2009  Solomita ............... G06F 9/4812
                                                            710/260

* cited by examiner

*Primary Examiner* — Titus Wong

(57) ABSTRACT

Disclosed herein is a method for improving Input/Output (I/O) performance in a host system having multiple CPUs. Under this method, various interrupt affinity schemes are provided, which associate multiple processors, interrupts, and I/O channels for sending the interrupts, thereby allowing the interrupts to be almost evenly loaded among the multiple I/O channels and processors. Also, data locality ("warm cache") can be achieved through the interrupt affinity schemes that associate each interrupt to its source processor, namely, the processor originating the I/O request that results in the interrupt.

16 Claims, 7 Drawing Sheets

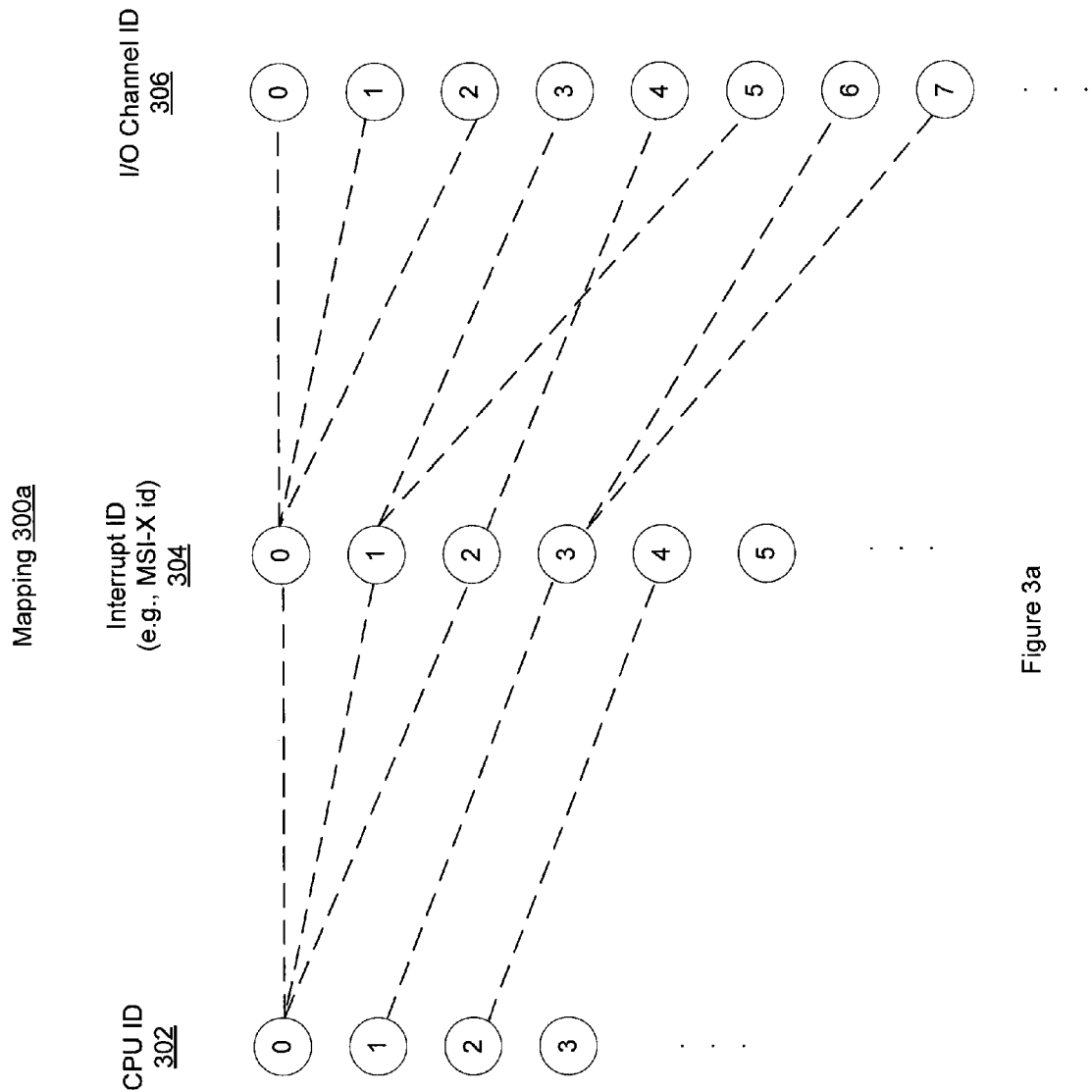

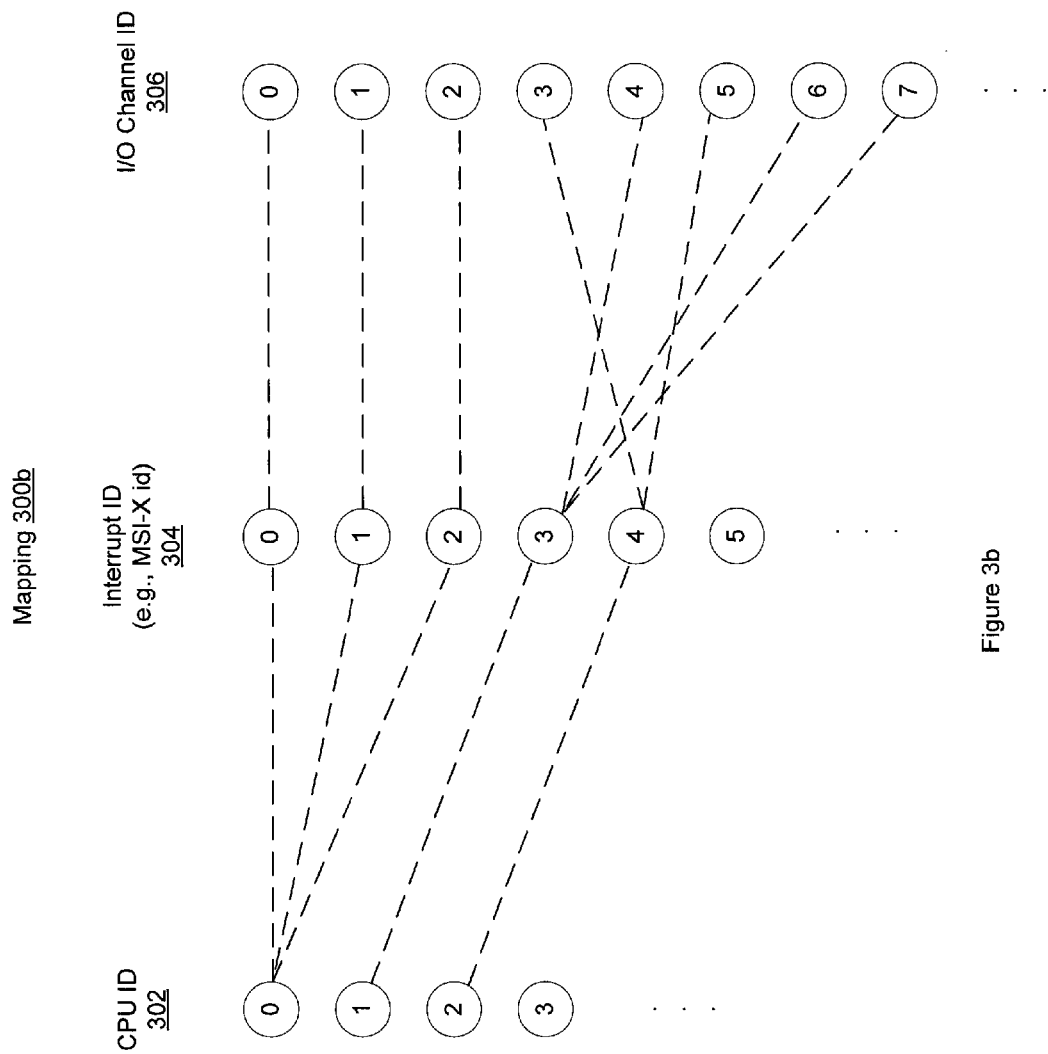

ENHANCED I/O PERFORMANCE IN A MULTI-PROCESSOR SYSTEM VIA INTERRUPT AFFINITY SCHEMES

CROSS-REFERENCE TO RELATED APPLICATION

This application is a continuation of application Ser. No. 14/087,953, filed Nov. 22, 2013, which is a continuation of application Ser. No. 12/577,031, filed Oct. 9, 2009, now U.S. Pat. No. 8,635,387, issued Jan. 21, 2014. The above-referenced United States patent applications are all hereby incorporated by reference in their entirety.

FIELD

This relates to Input/Output (I/O) performance in a host system having multiple processors, and more particularly, to efficient usage of multiple processors in handling I/O completions by using interrupt affinity schemes that associate various interrupts for I/O completions to their corresponding processors for processing.

BACKGROUND

Most data centers have bottleneck areas that impact application performance and service delivery to users. One of those bottlenecks could be poor I/O performance in a host or server, which usually results in increased response time and latency, as additional activity or application workload including transactions or file access is formed and queued. Particularly, in a host system having multiple processors, each processor can be executing multiple host applications, which frequently causes a large number of I/O commands from different processors to be serviced. In addition, the interrupts resulting from completion of those I/O commands need to be processed timely enough for each processor that has requested the I/O to be aware of the completions in order to proceed with its assigned applications. Without proper coordination, poor I/O performance in a multi-CPU system can cause significant time delay that would almost defeat the purpose of using multiple processors to expedite application or transaction processing.

Among existing multi-processor systems, there are various solutions to improve I/O performance, such as designating a particular processor out of the multiple processors for handling all interrupts arising from any I/O transactions. However, none of these solutions can achieve system-wide efficiency in minimizing time for processing interrupts in connection with I/O performance in multi-processor systems.

SUMMARY

Embodiments of the present invention relate to improving Input/Output (I/O) performance in a host system having multiple CPUs. In one embodiment, a method for improving Input/Output (I/O) performance in a multi-processor system comprises: creating an interrupt affinity scheme having associations between a plurality of processors, interrupt identifiers and I/O channels; generating an interrupt upon completion of an I/O command; and sending said interrupt from as particular I/O channel of said I/O channels to a particular processor of said processors in accordance with said interrupt affinity scheme, said interrupt having an interrupt identifier associated with said particular processor and said particular I/O channel. This method can comprise further steps of identifying a first mapping scheme having a first group of associations between said processors and said interrupt identifiers; creating a second mapping scheme in accordance with said first mapping scheme, said second mapping scheme having a second group of associations between said interrupt identifiers and said I/O channels; and including said first and second mapping schemes in said interrupt affinity scheme.

In another embodiment, a method for improving CPU usage in handling Input/Output (I/O) performance comprises: identifying on interrupt affinity scheme in a system having a number of processors, said interrupt affinity scheme comprising associations between said processors and a number of interrupt identifiers to be requested for generating interrupts upon I/O completions; and associating said interrupt identifiers with a number of I/O channels in accordance with said interrupt affinity scheme such that interrupts sent from said I/O channels are evenly distributed to each of said processors for processing.

Yet another embodiment of the invention provides a method of improving CPU usage in handling Input/Output (I/O) performances in a multi-processor system, which comprises: detecting a total number of interrupt identifiers available in said system, each interrupt identifier to be used for generating an interrupt upon an I/O completion; for each interrupt identifier, creating a worker kernel thread for handling interrupts having the interrupt identifier; and binding each created worker kernel thread to a unique processor among multiple processors in said system, said unique processor associated with the interrupt identifier corresponding to the worker kernel thread according to an interrupt mapping scheme comprising associations between different processors and said interrupt identifiers.

According to an alternative embodiment of the invention, a method for processing interrupts in a multi-processor system is provided, which comprises; receiving an interrupt triggered by completion of an Input/Output (I/O) command, said interrupt having an interrupt identifier; identifying a processor from multiple processors for processing said interrupt, said processor associated with said interrupt identifier according to an interrupt affinity scheme comprising associations between said multiple processors and a number of interrupt identifiers including said interrupt identifier; and processing said interrupt at said processor.

Also, one embodiment of the invention provides a multi-processor system comprising: a host comprising multiple processors, each of said processors configured to generate Input/Output (I/O) requests and process interrupts; and a host bus adapter coupled with said host, said host bus adapter comprising having multiple I/O channels, each of said I/O channels configured to receive said I/O requests from said host, wherein said host bus adapter is configured to generate said interrupts upon completion of said I/O requests and select one of said multiple I/O channels for sending each of said interrupts back to said host in accordance with an interrupt affinity scheme comprising associations between said processors, multiple interrupt identifiers and said I/O channels. The host bus adapter of this system can be further configured to identify a first mapping scheme comprising a first group of associations between said processors and said interrupt identifiers; establish a second mapping scheme in accordance with said first mapping scheme, said second mapping scheme comprising a second group of associations between said interrupt identifiers and said I/O channels; and create said interrupt affinity scheme by incorporating said first and second mapping schemes.

Embodiments of the present invention also provide computer readable storage media comprising computer-executable instructions in which the above-described methods can be implemented. For example, one embodiment of the invention provides computer readable storage medium comprising computer-executable instructions, said instructions, when executed, causing a computer to: create an interrupt affinity scheme comprising associations between a plurality of processors, interrupt identifiers and I/O channels in a multi-processor system; generate an interrupt upon completion of an I/O command; and send said interrupt from a particular I/O channel of said I/O channels to a particular processor of said processors in accordance with said interrupt affinity scheme, said interrupt having an interrupt identifier associated with said particular processor and said particular I/O channel.

BRIEF DESCRIPTION OF THE DRAWINGS

FIG. 3a-b show exemplary mapping schemes for establishing an interrupt affinity to improve I/O performance and CPU usage in the system of FIG. 1 according to various embodiments of the present invention;

DETAILED DESCRIPTION OF THE PREFERRED EMBODIMENTS

In the following description of preferred embodiments, reference is made to the accompanying drawings which form a part hereof, and in which it is shown by way of illustration specific embodiments in which the invention can be practiced. It is to be understood that other embodiments can be used and structural changes can be made without departing from the scope of the embodiments of this invention.

Embodiments of the present invention relate to improving Input/Output (I/O) performance in a host system having multiple CPUs. In particular, embodiments of the present invention aim to use the multiple processors efficiently by evenly distributing and loading all interrupts triggered by I/O completions among the processors, and further, to take advantage of data locality by associating each interrupt to its source processor, namely, the processor originating the I/O request that results in the interrupt. To that end, embodiments of the present invention provide various interrupt affinity schemes that associate multiple processors, interrupts, and I/O channels for sending the interrupts, which allows the interrupts to be evenly loaded among the multiple I/O channels.

Although embodiments of the invention may be described and illustrated herein using interrupt-CPU mapping schemes pre-defined by certain operating systems, such as Solaris by Sun Microsystems, Inc., to demonstrate how to create interrupt affinity schemes, it should be understood that embodiments of this invention are not so limited, but may additionally allow for creating interrupt affinity schemes in the absence of such pre-provided mapping schemes. In addition, although embodiments of the invention may be described and illustrated herein in terms of implementation in certain hardware components such as a host bus adapter and an I/O controller hub, it should be understood that embodiments of the invention can be implemented in variable ways depending on specific structures of different multi-processor systems.

Figure 1:
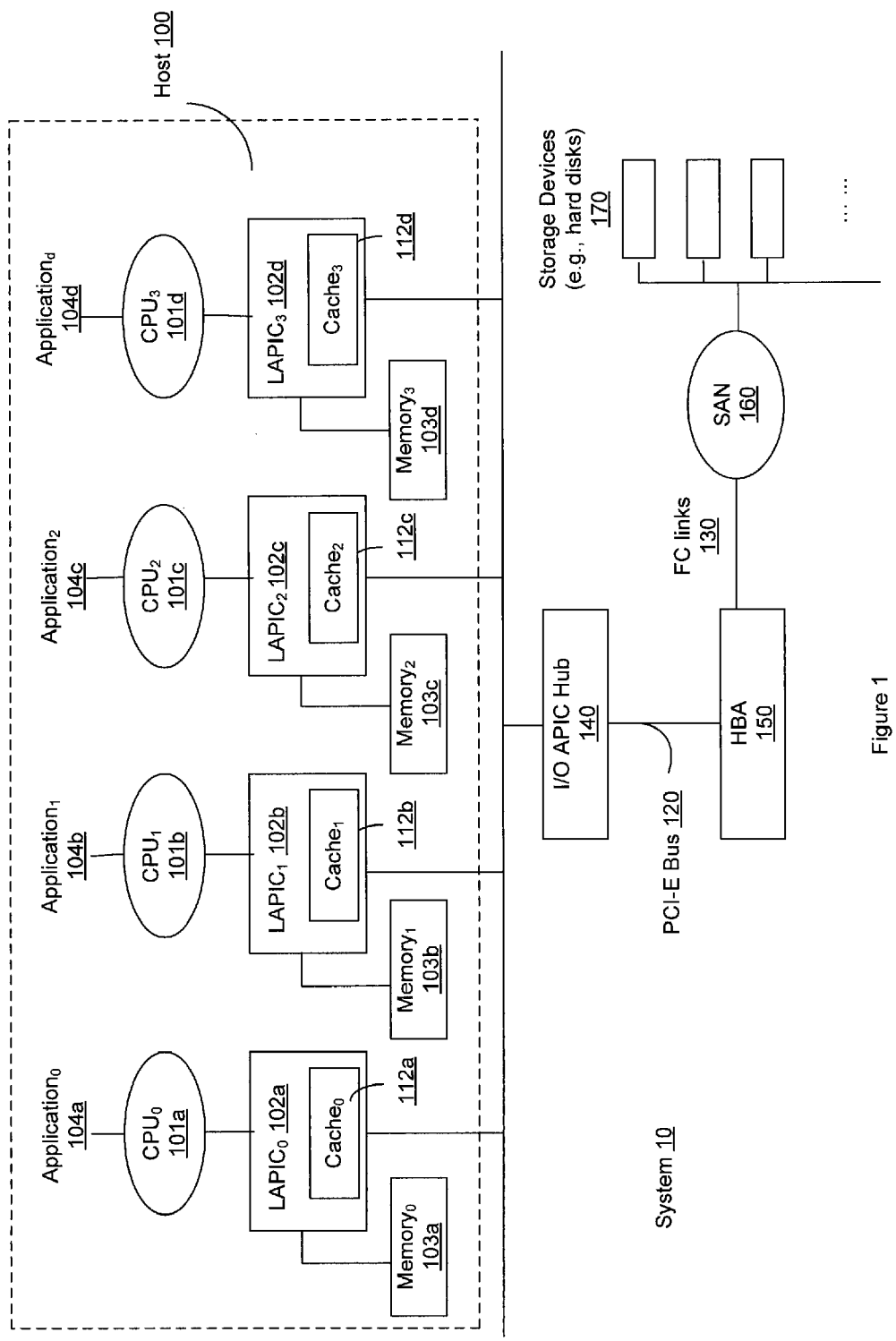
FIG. 1 is a block diagram illustrating an exemplary configuration of a multi-processor system according to various embodiments of the present invention.

FIG. 1 is a block diagram illustrating an exemplary configuration of a multi-processor system 10 in which the overall I/O (Input/Output) performance and CPU usage can be improved according to various embodiments of the present invention. As shown in FIG. 1, the multi-processor system 10 comprises, at a high level, a host 100, coupled with a Host Bus Adapter (HBA) 150, which is configured to communicate with a Storage Area Network (SAN) 160 that is attached to a number of computer storage devices 170, such as hard disks, tape libraries, and optical jukeboxes. A SAN, such as the SAN 160 in FIG. 1, is usually utilized to attach remote computer devices to different servers, such as the host 100 in FIG. 1, so that those remote storage devices can be easily accessed as if they are local to the servers.

To further facilitate communications, including transmission of data or commands for data between the SAN 160 and the host 100, an adapter or host controller, such as the HBA 150, is typically introduced in the system to assist with certain tasks, such as processing I/O commands, generating interrupts in response to I/O completions, reading data into a host memory through DMA (Direct Memory Access) actions, and so forth. As shown in FIG. 1, a number of Fibre Channel (FC) links 130 or other data links are employed for establishing transmission connections between the HBA 150 and the SAN 160, which typically support different transport protocols including without limitation Fibre Channel (FC) protocol, Small Computer System Interface (SCSI) protocol, Fibre Channel over Ethernet (FCoE) protocol, and ATA over Ethernet (AoE) protocol. On the other hand, the HBA 150 is coupled to the host 100 as either an integrated or separate component. The HBA 150 is configured to communicate with the host 100 over a host bus, such as a PCI (Peripheral Component Interconnect) bus, a PCI-E (Peripheral Component Interconnect Express) bus 120 shown in FIG. 1, or any other type of host bus known in the art.

Typically, a simplified I/O process works as follows: the host 100 sends an I/O request to the HBA 150 over the PCI-E bus 120 for data to be retrieved from a remote storage device into a memory of the host 100 (or in a reverse direction), and the HBA 150, after retrieving the data through the SAN 160 and performing a DMA (Direct Memory Access) action to write data in the memory of the host 100, would respond by generating an interrupt to notify the host 100 of the I/O completion. Given the large number of I/O processes between the host 100 and HBA 150, an interrupt controller, such as an I/O APIC (Input/Output Advanced Programmable Interrupt Controller) Hub 140 in FIG. 1, can be used to manage I/O completions and corresponding interrupts. In one embodiment, the I/O APIC Hub 140 is configured to, upon receiving each interrupt from the HBA 150, determine which processor, among the multiple processors of the host 100, should receive and process the interrupt.

As shown in FIG. 1, the host 100 comprises multiple processors, such as $CPU_0$ 101a, $CPU_1$ 101b, $CPU_2$ 101c, and $CPU_3$ 101d. Although only four processors are depicted in FIG. 1, it should be understood that the host 100 may comprise any number of processors depending on the specific system configuration. In one embodiment, each processor is coupled with a LAPIC (Local Advanced Programmable Interrupt Controller), such as $LAPIC_0$ 102a, $LAPIC_1$ 102b, $LAPIC_2$ 102c, or $LAPIC_3$ 102d, that has access to a local cache, for example, $Cache_0$ 112a, $Cache_1$ 112b, $Cache_2$ 112c, or $Cache_3$ 112d. Each LAPIC is configured to handle interrupts received from the HBA 150 by accessing its local cache storing the most frequently-used data and/or instructions for processing the interrupts. Alternatively, without the LAPIC, each processor can be configured to execute software programs or codes stored in the memory for processing interrupts received from the HBA 150.

FIG. 1 depicts a number of memories, including $Memory_0$ 103a, $Memory_1$ 103b, $Memory_2$ 103c and $Memory_3$ 103d, each of which is coupled with a processor and/or associated LAPIC. These memories can be separate or consecutive memory units in the host 100, or represent addresses of memory space that is physically close to their corresponding processor. Each memory is configured to receive and store data from various host applications or from outside the host 100, such as from the remote storage devices 170, and provide access to such data for its related processor. It should be understood that the number of CPU, LAPIC, cache and memory shown in FIG. 1 is for illustration purposes only, and can be increased or reduced as needed in actual implementation.

Figure 2:
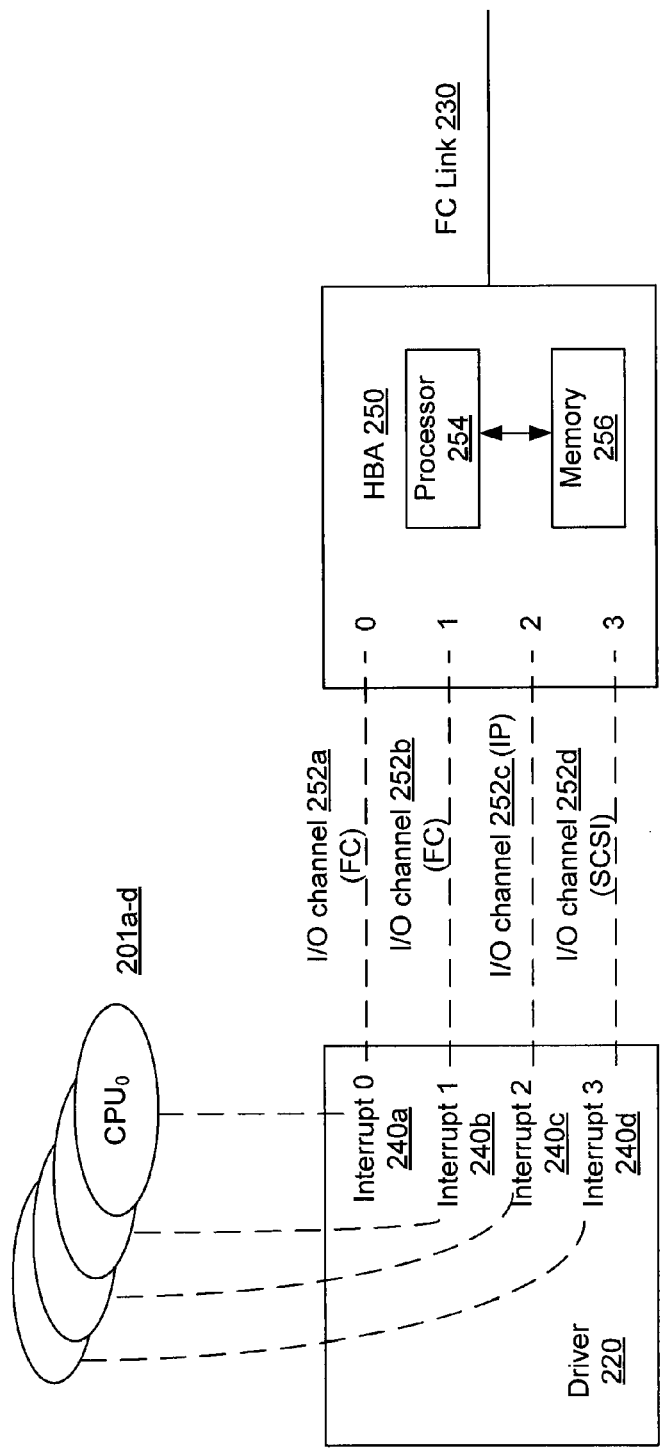
FIG. 2 is a block diagram showing an exemplary configuration of a Host Bus Adapter (HBA) and associated driver for processing I/O operations in the system of FIG. 1 according to various embodiments of the present invention.

The host 100 also includes one or more applications to be executed in the host, such as $Application_0$ 104a, $Application_1$ 104b, $Application_2$ 104c, and $Application_3$ 104d illustrated in FIG. 1. These applications can range from a local software application (e.g., an Oracle accounting application) to a web-based application (e.g., online data entry). In operation, each application can be assigned to and handled by a designated processor. For example, $Application_0$ 104a can be assigned to $CPU_0$ 101a for execution. While $Application_0$ 104a is being executed at $CPU_0$, certain data may be needed from a remote hard disk, which will trigger an I/O process for purposes of obtaining such data. The I/O process starts with an I/O request from $CPU_0$. In one embodiment, such an I/O request is transmitted to the HBA 150 and more particularly, to one of the multiple I/O channels therein, as shown in FIG. 2. In response to the I/O request, the HBA 150 retrieves the data from the relevant storage device over SAN 160 and writes the data into a certain address of the host memory, which, for example, can be any one of the illustrated $Memory_0$ 103a, $Memory_1$ 103b, $Memory_2$ 103c and $Memory_3$ 103d. Once the I/O operation is completed, the HBA 150 generates an interrupt and submits the interrupt to the I/O APIC Hub 140 so that ultimately the host 100 is notified of the I/O completion and can access the required data. Such an interrupt can be one of following types of interrupts that are supported by most current operating systems, such as Solaris provided by Sun Microsystem Inc., including (1) a conventional or legacy interrupt that is signaled using one or more external interrupt pins that are wired "out of band" (i.e., separate from main lines of the host bus), (2) a Message-Signaled Interrupt (MSI) that is an "in-band" message implemented as writing a particular value in a particular address, and (3) an Extended Message-Signaled Interrupt (MSI-X) that is an enhanced version of MSI with additional advantages such as an increased number of messages, address independency, etc.

In most existing systems and methods, the host 100 would designate a particular processor, $CPU_3$, for example, to handle all interrupts sent from the HBA 150, regardless of the source of each interrupt, i.e., which processor originally requested the I/O corresponding to that interrupt. Thus, for example, whether $CPU_0$ or $CPU_1$ has requested the performance of an I/O operation, once that I/O operation is completed, the triggered interrupt would always be sent back to $CPU_3$ for preliminary handling or processing before $CPU_0$ is notified. As a result of such an arrangement, certain coordination or synchronization is required between $CPU_0$ and $CPU_3$ or $CPU_0$ and $CPU_3$ in order for the I/O completion message to be delivered to $CPU_0$ or $CPU_1$. In addition, when the I/O request and resulting interrupt are originated from $CPU_0$, data or instructions necessary for processing the interrupt were stored in $Cache_0$ to which the designated $CPU_3$ does not have direct local access. This requires $CPU_3$ to first locate the proper hardware cache that includes the interrupt related information (i.e., "warm cache"), thereby causing additional delay in processing the interrupt. When there are a large number of I/O completions, the designated processor for handling all interrupts can easily become the bottleneck, as all other processors have to wait for their I/O responses before they can proceed with their pending applications. Therefore, despite the existence of multiple processors, the total number of I/O requests that can be processed by the system would be limited to the capacity of the single processor designated for handling interrupts. Such imbalanced usage of different CPUs significantly compromises the overall system efficiency.

Currently, various solutions have been introduced to balance the usage of all CPUs in a multi-CPU system by assigning or distributing interrupts to different processors. For example, Solaris, an OS (Operating System) provided by Sun Microsystem, Inc., defines an affinity or mapping between multiple CPUs and different interrupts. Specifically, the system associates one or more interrupts, each having a unique identifier, to a particular CPU among the multiple CPUs. As a result of such association, when the OS receives an interrupt, the system can determine from the unique interrupt ID which corresponding CPU should be used for handling the interrupt. By evenly distributing interrupts to different processors, the system can achieve a balanced loading on each CPU.

FIG. 2 is a block diagram showing an exemplary configuration of a Host Bus Adapter (HBA) 250 and associated driver 220 for performing I/O operations in a multi-processor system, such as the one illustrated in FIG. 1, according to various embodiments of the present invention. As shown in FIG. 2, the HBA 250 comprises multiple I/O channels, i.e., I/O channels 252a-d. Each I/O channel is configured to carry demands from the driver 220 to the HBA 250, or conversely, responses (e.g., interrupts) from the HBA 250 to the driver 220. As aforementioned, the HBA 250 is also configured to communicate with a SAN using, for example, the PC links 230 shown in FIG. 2. The HBA 250 also comprises a processor 254 and a memory 256 coupled to the processor through a bus (not shown). The processor 256 can be any conventional processor such as an Intel® Pentium® or Core Duo™ microprocessor by Intel Corporation. The memory 256 can be dynamic or static random access memory (RAM). In one embodiment, the memory 256 is configured to store data as well as computer-executable instructions for executing certain processes or one or more steps therein, such as the flowchart diagrams illustrated in FIGS. 5 and 6. As can be understood by a person of ordinary skill of art, such computer-executable instructions are written in a computer programming language. In operation, the processor 254 can access the computer-executable instructions in the memory 256 for performing the methods described herein.

The driver 220 usually comprises software code to be executed by the host computer. In one embodiment, the driver 200 is configured to initialize the settings in the HBA 250, such as configurations of each of the I/O channels 252a-d that typically define what type of devices are associated with each I/O channel, or what type of commands are to be carried by each channel, or what type of protocol is to be supported by each channel. For example, I/O channel 252d can be pre-configured and reserved for transmitting SCSI commands. It should be understood that although only four I/O channels are shown in FIG. 2, the HBA 250 can be configured with any number of I/O channels in different implementations.

In FIG. 2, four exemplary interrupts 240a-d are illustrated, i.e., Interrupt 0, Interrupt 1, interrupt 2, Interrupt 3, and each interrupt has a unique identifier (e.g., 0, 1, 2, or 3). It should be understood that the interrupt IDs in FIG. 2 are for illustration only and various forms of identifiers can be used for different types of interrupts. According to a pre-defined mapping or affinity scheme, such as the one provided in a Solaris system, each interrupt can be associated with a particular CPU in a group of CPUs, such as CPUs 201a-d. For example, as illustrated in FIG. 2; Interrupt 0 is assigned to $CPU_0$, Interrupt 1 to $CPU_1$, Interrupt 2 to $CPU_2$, and interrupt 3 to $CPU_3$. In operation, upon an I/O completion, the HBA 250 requests an interrupt ID and generates an interrupt accordingly. The generated interrupt will be sent back to the host via one of the multiple I/O channels in the HBA 250. As an example, if the generated interrupt is in the form of interrupt 0, the host operating system can determine from the interrupt ID, i.e., zero (0), that $CPU_0$ should be the processor to process this interrupt. Likewise, if the interrupt is interrupt 3, the operating system can determine from the interrupt ID being three (3) that $CPU_3$ should be the processor to process this interrupt. However, if the HBA 250 is given the same interrupt ID each time for generating an interrupt, every interrupt will be sent back to the same CPU associated with that interrupt ID, which would result in one processor being overly busy as if it is fully designated for processing interrupts. Also, ideally, if the completed I/O was initially requested by $CPU_0$, then $CPU_0$ should be the processor to handle the corresponding interrupt in order to take the advantage of warm cache or data locality. That requires the USA 250 to generate the interrupt using an interrupt ID of zero. However, the HBA would not know which processor initiated the I/O request or which interrupt ID is to be used for matching the right processor. Using the example illustrated in FIG. 2, there is only 25% chance of such matching when the HBA 250 can randomly assign any one of the four CPUs to a received I/O completion. Therefore, the existing interrupt-processor affinity scheme is insufficient for evenly distributing interrupts among multiple processors or automatically sending an interrupt to its source processor, namely, the processor that requested the I/O triggering the interrupt.

As aforementioned, any one of the I/O channels 252a-d can be used for passing I/O requests from different processors of the host to the HBA and sending responses/interrupts from the HBA back to the host. In either direction, there are multiple I/O channels to choose from, which add the uncertainty or difficulty in tracking down the source processor of each I/O request and destination processor for each interrupt. For example, an I/O request can be received from I/O channel 252a, and the interrupt responsive to the I/O completion can be sent through I/O channel 252c. In addition, without knowing how frequently each channel is being or will be used for carrying the interrupts, the HBA may overload one particular channel. One approach is to pre-configure the I/O channels to the extent that they each are associated with different types of devices, data commands or communication protocols to be utilized in completing the I/O operation. As a result of such a configuration, when an I/O request is received, depending on which types of devices, data commands or communication protocols need to be used in servicing the I/O request, the driver 220 can identify the associated channel for passing the request to the HBA 250. Likewise, when the I/O operation is completed, depending on which types of devices, data commands or communication protocols are used in the I/O performance, the HBA 250 can identify the associated I/O channel for sending back the response or interrupt. This way, the I/O requests and corresponding interrupts for the same types of devices, data commands or communication protocols will always share the same I/O channel. For example, as illustrated in FIG. 2, the I/O channels 252a and 252b are programmed for FCP (Fibre Channel Protocol) commands, the I/O channel 252c for IP (Internet Protocol) commands, and the I/O channel 252d for SCSI (Small Computer System Interface) commands. If a received I/O command is a SCSI command, the I/O channel 252d will be selected for sending this I/O command to the HBA 250, and once the I/O operation is completed, the resulting interrupt will be sent back to the host over the same I/O channel 252d.

The above-described approach works well when there is an even distribution of I/O completions among different types of devices, data commands or communication protocols. In operation, however, there may be a large number of I/O operations for SCSI commands, and as such, the I/O channel 252d designated for SCSI commands will be heavily loaded with I/O requests and responses. Accordingly, a better solution is needed for efficient usage of multiple I/O channels, interrupts and processors in a multi-CPU system.

FIGS. 3a-b provide exemplary mapping schemes 300a-b that establish an affinity between different I/O channels, interrupts and processors for improving I/O performance in a multi-CPU system as illustrated in FIG. 1 according to one embodiment of the present invention. Both mapping schemes, 300a in FIG. 3a and 300b in FIG. 3b, include a first mapping between a number of CPU IDs 302 and a number of interrupt IDs 304, and a second mapping between the interrupt IDs 304 and multiple I/O channel IDs 306. Typically, the mapping or association between the CPU IDs and interrupt IDs are set up by the operating system of a multi-CPU system, such as Solaris, when the system is initialized. In that mapping process, the OS detects a total number of processors in the system and a total number of interrupt IDs allocated for a specific instance of a device, and assigns one or more interrupts to one processor. In one implementation, a data table is created to store each pair of a CPU ID and associated interrupt ID. In an ideal situation, the mapping between the CPUs and interrupts can be one-to-one, meaning each interrupt is assigned to a unique CPU for processing. However, because the number of interrupts often exceeds the number of processors, one CPU can be assigned to process multiple interrupts. As shown in FIGS. 3a-b, the three interrupts, Interrupt 0, Interrupt 1 and Interrupt 2, are associated with the same processor, $CPU_0$, while Interrupt 3 is assigned to $CPU_1$, and interrupt 4 is assigned to $CPU_2$.

In one embodiment, the mapping or affinity between the interrupts and different I/O channels is established by the HBA 250 and associated driver 220. When the driver 220 is initialized to configure the I/O channels in the HBA 250, a copy of interrupt-CPU mapping or association scheme is saved and used for establishing the affinity between the I/O channels and interrupt IDs. Again, ideally, a one-to-one mapping between each unique I/O channel and each unique interrupt is desirable, but because the number of I/O channels oftentimes exceeds the number of interrupts, one or more I/O channels can be assigned to share one interrupt ID. For example, in FIG. 3a the I/O channels 0-2 share the same interrupt ID, Interrupt 0, and the I/O channels 3, 5 share the same interrupt ID, Interrupt 1.

There are variable ways to establish the I/O-interrupt affinity. For example, FIG. 3a demonstrates an I/O-interrupt affinity scheme without considering the pre-defined interrupt-processor scheme, while FIG. 3b provides another I/O-interrupt mapping scheme that takes into consideration the redefined interrupt-processor scheme. As will be described in detail below, with the mapping scheme illustrated in FIG. 3b, the multiple processors in the system can have a more balanced load of interrupts from different I/O channels.

FIG. 3a shows a random mapping of multiple I/O channels to different interrupt IDs without taking into consideration the CPU-interrupt association information. As seen in FIG. 3a, three channels, i.e., I/O channels 0-2, are mapped to Interrupt 0, two channels, i.e., I/O channels 3 and 5, are mapped to interrupt 1, and I/O channel 4 is mapped to Interrupt 2. Because all these three interrupts, Interrupts 0-2, are mapped to or associated with the same processor, $CPU_0$, this processor will be loaded with interrupts received from six channels (I/O channels 0-5) in total. $CPU_0$ can be heavily loaded, especially compared with the other processor, $CPU_1$, which will receive interrupts from only two channels, i.e., I/O channels 6 and 7, according to the mapping scheme 300a in FIG. 3a. This would cause an unbalanced usage of CPUs and inefficient handling of I/O requests.

In contrast, the Interrupt-I/O mapping scheme in FIG. 3b is based on the knowledge of the CPU-Interrupt association. Since $CPU_0$ is known to have been designated for processing interrupts having IDs of 0-2, while $CPU_1$ is only designated for one interrupt ID of 3 and $CPU_2$ is for interrupt 4 only, the HBA and driver can assign or map fewer I/O channels to interrupt IDs 0-2 than interrupt IDs 3 or 4 so that interrupts received from different I/O channels can be evenly distributed among the multiple processors. For example, as illustrated in FIG. 3b, for Interrupts 0-2, only one I/O channel is mapped to each interrupt, namely, I/O channel 0 to Interrupt 0, I/O channel 1 to Interrupt 1 and I/O channel 2 to interrupt 2. This is different from Interrupt 3 to which three channels (I/O channels 4, 6, 7) are mapped, or Interrupt 4 to which two channels (I/O channels 3, 5) are mapped. Ultimately, $CPU_0$ and $CPU_1$ will each handle interrupts from three channels and $CPU_2$ will process interrupts from two I/O channels, resulting in enhanced CPU usage in a multi-CPU system.

Figure 4:
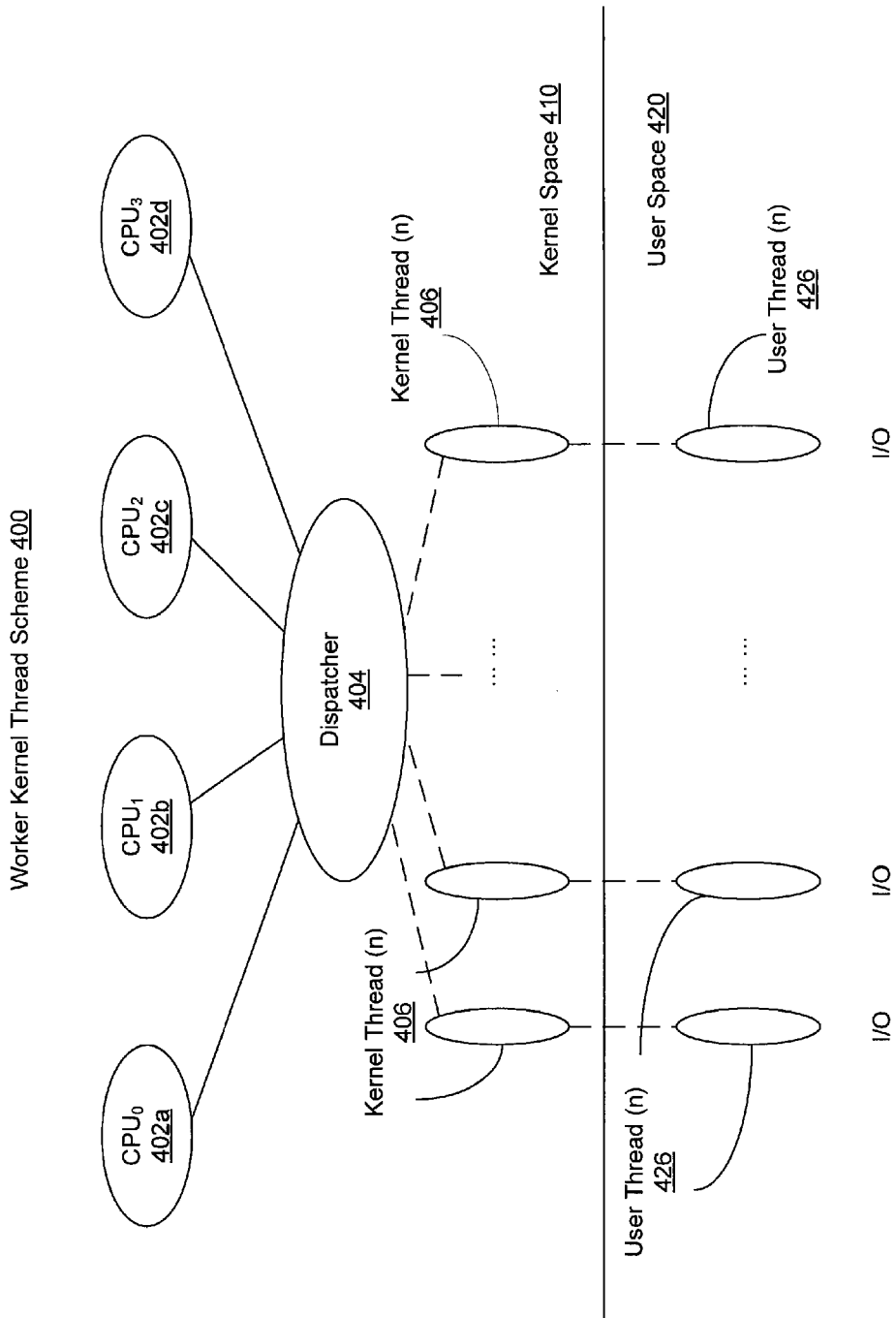
FIG. 4 provides a kernel thread scheme for establishing an interrupt affinity to improve I/O performance and CPU usage in the system of FIG. 1 according to various embodiments of the present invention.

Referring to FIG. 4, a worker kernel thread scheme 400 is provided for establishing the affinity between different I/O channels, interrupts and processors in a multi-CPU system as illustrated in FIG. 1 according to another embodiment of the present invention. Many operating systems, such as Solaris, have implemented a multi-threaded process model. Under such a model, the I/O performance including I/O completions and interrupts triggered therefrom can be viewed, at a detailed thread level, as involving multiple threads in two spaces, namely, the kernel space 410 and the user space 420 as shown in FIG. 4. In the user space 420, for example, an I/O process can be viewed as including a number of user threads 426. Each user thread 426 corresponds to a unique kernel thread 406 that is hound to a unique processor of the multiple CPUs 402a-d. Typically, all kernel threads 406 in the kernel space are managed by a dispatcher 404. In one configuration, the dispatcher 404 receives a kernel thread 406, identifies a processor that the thread is bound with, and inserts each kernel thread into a per-processor dispatch queue associated with the processor. The kernel thread usually waits in the dispatch queue until a system scheduler decides that the priority of this kernel thread becomes current and the kernel thread is ready to be serviced by its bound processor.

In the context of I/O performance, a dedicated worker kernel thread can be employed by each processor to assist an interrupt thread with processing completed I/O commands. Without a dedicated worker kernel, a simplified I/O completion process, at a detailed thread level, works as follows: when an interrupt is received at a processor, it triggers the interrupt thread, which, due to its highest priority, would require the processor to stop all other threads in the middle of processing to service the interrupt thread. This is often not the best way of utilizing the processor. The use of a dedicated worker kernel thread improves the CPU usage by allowing the interrupt thread to hand over the process for any completed I/O commands to the worker thread. Specifically, once a dedicated worker kernel thread is created for the interrupt thread, it is placed in a round queue (e.g., a per-processor dispatch queue) and remains in the sleeping mode until it is woken up by the interrupt thread. When an interrupt is received at the processor, the interrupt thread performs certain operations and wakes up the dedicated worker kernel thread and hands over to it the remaining process for the I/O completion triggering the interrupt. Because the dedicated worker kernel thread has a pre-assigned priority that may or may not become current, the processor does not have to stop processing other threads in the middle. Rather, the processor can take time to service the dedicated worker kernel thread, as with all other threads waiting in the round queue.

As described above, a worker kernel thread can be bound with a unique processor, while each interrupt ID is also associated with a unique processor according to the interrupt-processor affinity already provided by the operating system. Therefore, it is desirable to create at least one worker kernel thread for all interrupt IDs associated with one processor and bind this worker kernel thread to the same processor. In one embodiment, the worker kernel threads for I/O purposes are created during system initialization when a total number of interrupt IDs are detected, and for each interrupt ID a corresponding worker kernel thread is created and further bound to a processor associated with that interrupt ID based on the CPU-Interrupt affinity already provided by the system. In an alternative embodiment, the worker kernel threads can be created and configured dynamically. In other words, instead of being pre-defined during the system initialization, a corresponding worker kernel thread is created whenever an interrupt triggered when an I/O completion is received at a processor.

In creating a worker kernel thread, kernel calls such as thread_create( ) provided by Solaris can be used. Usually when a kernel worker thread is first created via thread_create( ), the scheduling class of this thread is inherited from the thread issuing the thread_create( ) call, and the CPU assigned to the kernel thread, by default, would be the one in which the thread_create( ) code is being executed. The priority of the work kernel thread can be adjusted by specifying a value in the thread_create( ) call. The thread affinity with different processors can then be established or adjusted through kernel calls such as thread_affinity_set(kthread_id_t t, int processorid_t) and thread_affinity_clear(kthread_id_t t). It should be understood that the above-listed kernel calls are only exemplary, and there are many variations in creating worker kernel threads and establishing their affinity with different processors.

Figure 5:
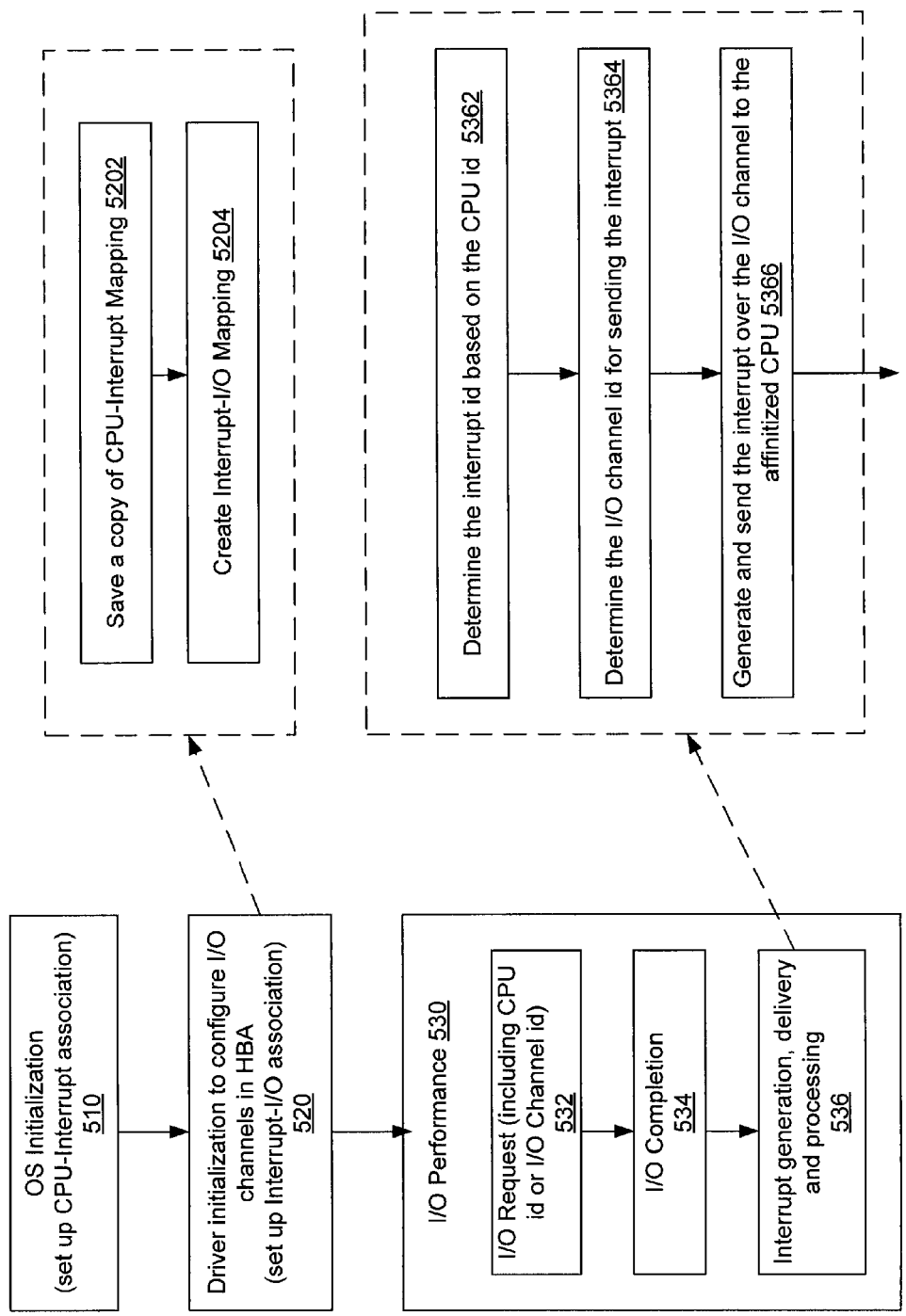
FIG. 5 is a flowchart showing an exemplary process for handling I/O operations and interrupts by use of the mapping scheme illustrated in FIGS. 3a-b according to various embodiments of the present invention.

FIG. 5 is a flowchart showing an exemplary process of handling I/O requests using the mapping or affinity scheme illustrated in FIGS. 3a-b according to various embodiments of the present invention. As shown in FIG. 5, the process starts as the system is initialized at step 510, where the CPU-Interrupt affinity or association, as illustrated in FIGS. 3a-b, is established. At step 520, the driver is initialized to configure the multiple I/O channels in the HBA so that an affinity or mapping scheme between the interrupt IDs and the channel IDs is established. This is accomplished by having a copy of the CPU-interrupt scheme that is pre-defined by the operating system at step 5202, and creating the interrupt-I/O mapping scheme according to the CPU-interrupt scheme at step 5204. The general goal of step 520 is, as described above with reference to FIGS. 3*a*-*b*, to ensure that interrupts from different I/O channels are more evenly distributed and assigned to different processors in the system.

A typical I/O performance module 530 includes the following steps: receiving an I/O request for data in or out of remote storage devices in a HBA at step 532, I/O completion by the HBA at step 534, and triggering interrupts upon I/O completion and sending the interrupts back for processing at a certain CPU at step 536. In one embodiment, the I/O request includes it CPU ID indicating the source processor of the I/O request. In another embodiment, the I/O request includes an I/O channel ID to designate which I/O channel should be used for sending back the reply or interrupt corresponding to the requested I/O operation. As will be described below, without the designated return I/O channel, by default the HBA will use the same I/O channel from which the I/O request was received for sending back a reply or an interrupt message. In operation, the HBA can store information regarding each received I/O request in a data table for future reference. For instance, the HBA can refer to the stored I/O request for the source processor ID or a designated I/O channel ID in generating the interrupt.

The interrupt generation, delivery and processing step 536 can be performed in variable ways, depending on specific system configurations including different I/O channels, interrupts IDs, CPUs and their association schemes. FIG. 5 provides one exemplary process comprising steps 5362-5366, the order of which can be varied in practice. As shown in FIG. 5, in generating an interrupt upon the I/O completion, the HBA first determines an interrupt ID for the interrupt at step 5362. This interrupt ID can be determined by identifying the source CPU ID included in the previously-stored I/O request and using the CPU-interrupt mapping scheme pre-stored in the HBA to identify at least one interrupt ID associated with that CPU. If no CPU ID is included in the original I/O request, the HBA can treat the processor on which the I/O was last executed as the source CPU for purposes of determining an interrupt ID. Alternatively, if the I/O request does not include the source CPU ID but a designated I/O channel ID instead, the HBA can refer to the interrupt-I/O mapping scheme created at step 520 to identify the interrupt ID associated with the designated I/O channel.

Once the interrupt ID is selected, the HBA can proceed to determine the I/O channel for sending back the interrupt to the source CPU at step 5364. The I/O channel can be determined in one of the following ways: (1) if the original I/O request includes an I/O channel ID, this previously designated channel will be used for sending the interrupt; (2) if no such I/O ID is included in the I/O request, then by default the I/O channel originally used for sending the I/O request will be used for sending the interrupt, or (3) the interrupt will be used to identify at least one associated I/O channel according to the interrupt-I/O mapping scheme created in the I/O channel configuration step 520 and the identified I/O channel will be used for sending the interrupt. For example, referring back to FIG. 2, if an I/O request is received from the I/O channel 252*d*, by default any response or interrupt upon the I/O completion will be sent back to the processor via the I/O channel 252*d*. But if the I/O request includes an I/O channel ID of one (1), the interrupt will be sent back from the I/O channel 252*b*, in the third approach, assuming an interrupt ID of three (3), i.e., Interrupt 3, is determined and in view of the mapping scheme in FIG. 3*b*, the I/O channel to be used can be any one of I/O channels 4, 5 and 7 associated with Interrupt 3.

At step 5366, an interrupt is generated using the interrupt ID and sent over the determined I/O channel hack to the source CPU for processing. As will be understood by those skilled in the art, many variations to the above-described process can be incorporated and implemented for improving I/O performance via a mapping or affinity scheme between different channels, interrupts and processors according to various embodiments of the invention.

Figure 6:
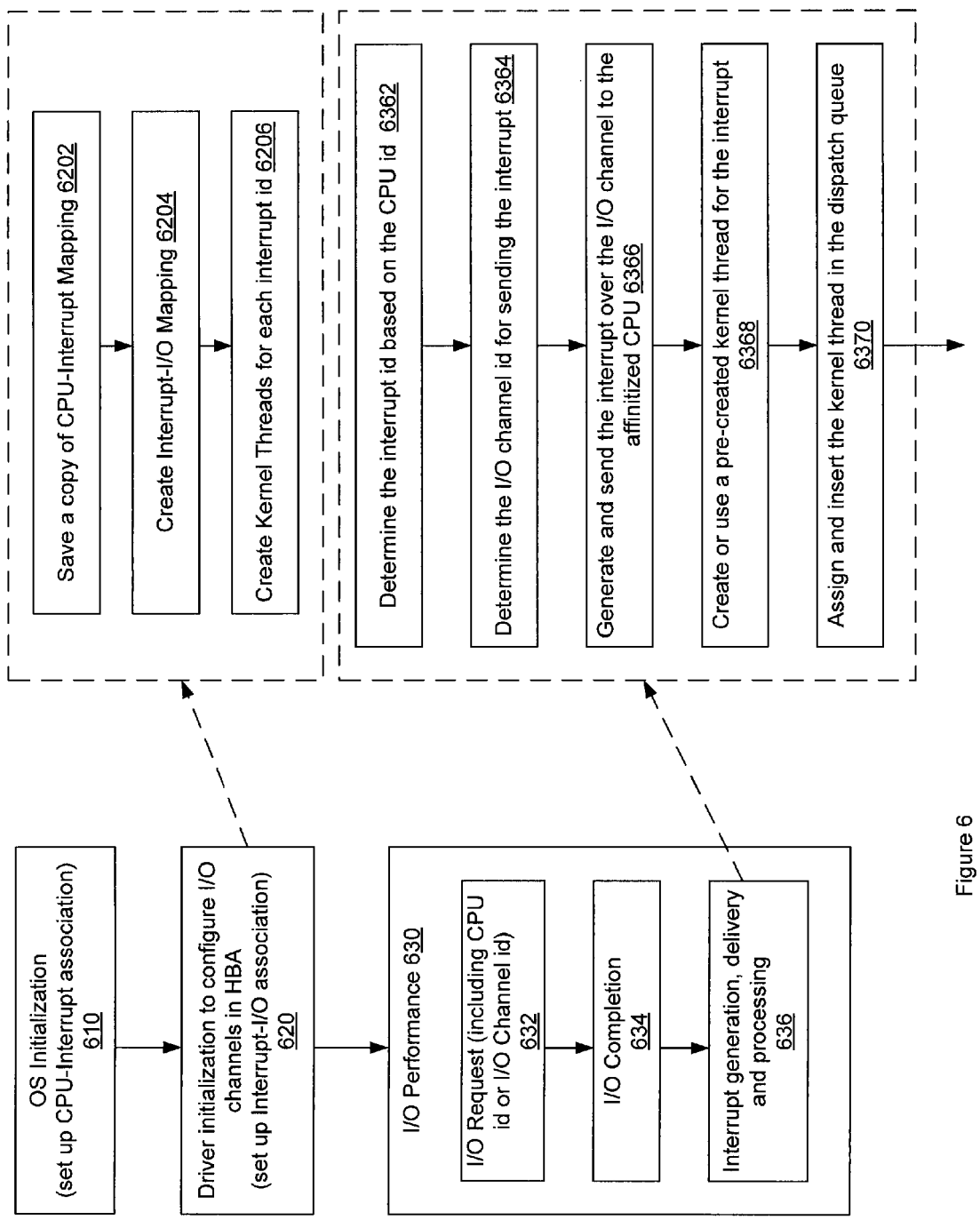
FIG. 6 is a flowchart showing an exemplary process for handling I/O operations and interrupts by use of the kernel thread affinity scheme illustrated in FIG. 4 according to various embodiments of the present invention.

FIG. 6 is a flowchart showing an exemplary process of handling I/O operations by use of to worker kernel thread affinity scheme, such as the illustration in FIG. 4, according to various embodiments of the present invention. Similar to FIG. 5, the exemplary process in FIG. 6 also includes a system initialization step 610 for the operating system to set up the CPU-Interrupt affinity, a channel configuration step 620 and the I/O performance module 630. Specifically, when the I/O channels are configured at step 620, it involves the following actions: a copy of the system-provided interrupt-CPU mapping is stored in the HBA at step 6202, an interrupt-I/O mapping is created according to the CPU-interrupt affinity at step 6204, and for each interrupt ID, a corresponding worker kernel thread is created and placed in a dispatch queue of the binding processor at step 6206. As described above with reference to FIG. 5, the worker kernel threads can be dynamically configured in response to interrupts received at each processor.

As with step 536 in FIG. 5, the interrupt generation, delivery and processing step 636 of FIG. 6 can be performed in variable ways, depending on specific system configurations. The exemplary process in FIG. 6 comprises steps 6362-6370, the order of which can be varied in practice. As shown in FIG. 6, in generating an interrupt upon receipt of an I/O completion, the HBA first determines an interrupt ID for the interrupt at step 6362. This interrupt ID can be determined by identifying the source CPU ID included in the previously-stored I/O request and using the CPU-interrupt mapping scheme pre-stored in the HBA to identity at least one interrupt ID associated with that CPU. If no CPU ID is included in the original I/O request, the HBA can treat the processor in which the I/O was last executed as the source CPU for purposes of determining an interrupt ID. Alternatively, if the I/O request does not include the source CPU ID but a designated I/O channel ID instead, the HBA can refer to the interrupt-I/O mapping scheme created at step 620 to identify the interrupt ID associated with the designated I/O channel. Once the interrupt ID is selected, the HBA can proceed to determine the I/O channel for sending back the interrupt to the source CPU at step 6364. The channel can be determined in one of the following ways: (1) if the original I/O request includes an I/O channel ID, this previously designated channel will be used for sending the interrupt; (2) if no such I/O ID is included in the I/O request, then by default the I/O channel originally used for sending the I/O request will be used for sending the interrupt, or (3) the interrupt ID will be used to identify at least one associated I/O channel according to the interrupt-I/O mapping scheme created in the I/O channel configuration step 520 and the identified I/O channel will be used for sending the interrupt. For example, referring back to FIG. 2, if an I/O request is received from the I/O channel 252*d*, by default any response or interrupt upon receipt of the I/O completion will be sent back to the processor via the I/O channel 252*d*. But if the I/O request includes an I/O channel ID of one (1), the interrupt will be sent back from the I/O channel 252b. In the third approach, assuming an interrupt ID of three (3), i.e., Interrupt 3, is determined and in view of the mapping scheme in FIG. 3b, the I/O channel to be used can be any one of channels 4, 5 and 7 associated with Interrupt 3. At step 6366, an interrupt is generated using interrupt ID and sent over the determined I/O channel back to the source CPU for processing.

When the interrupt is received at the correct processor, at step 6368 the interrupt thread wakes up a worker kernel thread corresponding to the interrupt to hand over the remaining process for the completed I/O command. As aforementioned, this worker kernel thread can be pre-created for the interrupt during the system initialization step of 620 or dynamically configured as the interrupt is being received. If the worker kernel thread is pre-created, it is already placed in the dispatch queue associated with the bound processor. Otherwise the newly created worker kernel thread will be assigned and inserted in the dispatch queue at step 6370. Once the priority of the worker kernel thread becomes current, the processor will attend to and service the thread, at which time the processor is notified of the I/O completion and concludes the pert of the I/O request.

The flowchart in FIG. 6 is an exemplary process, and as will be understood by those skilled in the art, many variations can be incorporated and implemented for improving I/O performances via a mapping or affinity scheme between different channels, interrupts and processors and a worker kernel scheme according to various embodiments of the invention.

In practice, the methods, processes or steps described herein may constitute one or more programs made up of machine-executable or computer-executable instructions. The above description with reference to the flowcharts in FIGS. 5 and 6 enables one skilled in the art to develop such programs, including such instructions to carry out the operations represented by logical blocks on suitably-configured processors. The machine-executable instructions may be written in a computer programming language or may be embodied in firmware logic or in hardware circuitry. If written in a programming language combining to a recognized standard, such instructions can be executed on a variety of hardware platforms and for interface to a variety of operating systems. The present invention is not described with reference to any particular programming language, but it will be appreciated that a variety of programming languages may be used to implement the teachings of the invention as described herein. Furthermore, it is common in the art to speak of software, in one form or another (e.g. program, procedure, process, application, module, logic), as taking an action or causing a result. Such expressions are merely a shorthand way of saying that execution of the software by a machine causes the processor of the machine to perform an action or produce a result. It will be further appreciated that more or fewer processes may be incorporated into the methods illustrated in the flow diagrams without departing from the scope of the invention and that no particular order is implied by the arrangement of blocks shown and described herein. In addition, one of ordinary skill in the art will recognize that the terms "computer-readable medium" or "machine readable medium" include memory space and any type of storage device accessible by a processor.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims.

What is claimed is:

1. A system, comprising:
   one or more processors operable to run a plurality of kernel threads, a different one or ones of the kernel threads being awake and in operation at different times;
   a memory coupled to the one or more processors, the memory storing a correspondence between an interrupt identifier of a plurality of interrupt identifiers and a given kernel thread of the plurality of kernel threads; and
   an Input/Output (I/O) device coupled to the one or more processors and the memory, wherein upon occurrence of an event that would cause the I/O device to direct an interrupt to the given kernel thread, the I/O device identifies whether the given kernel thread is awake, the I/O device being operable to bind the given kernel thread to a unique processor of the one or more processors in the system, the unique processor being associated with the interrupt identifier corresponding to the given kernel thread according to an interrupt mapping scheme comprising associations between the one or more processors and one or more of the plurality of interrupt identifiers;
   wherein the I/O device is operable to insert the given kernel thread in a thread queue in the unique processor to which the given kernel thread is bound; and
   wherein if it is determined that the given kernel thread is not awake nor in operation, the I/O device is operable to use the interrupt identifier to generate the interrupt.

2. The system of claim 1, wherein the I/O device is operable to wake up the given kernel thread if it is determined that the given kernel thread is not awake.

3. The system of claim 1, wherein if it is determined that the given kernel thread is awake and in operation, the I/O device is operable to raise the interrupt immediately.

4. The system of claim 1, wherein the I/O device is operable to detect a total number of interrupt identifiers available in the system.

5. The system of claim 1, wherein the event that would cause the I/O device to direct the interrupt to the given kernel thread is an I/O completion.

6. The system of claim 1, wherein the I/O device is operable to create a kernel thread for handling an interrupt.

7. The system of claim 1, wherein the I/O device is operable to assign a priority to the given kernel thread, the priority indicating when the kernel thread is to be serviced in the thread queue.

8. A method for processing interrupts, the method comprising:
   running a plurality of kernel threads in one or more processors, a different one or ones of the kernel threads being awake and in operation at different times;
   storing a correspondence between an interrupt identifier of a plurality of interrupt identifiers and a given kernel thread of the plurality of kernel threads; and
   binding the given kernel thread to a unique processor of the one or more processors, the unique processor being associated with the interrupt identifier corresponding to the given kernel thread according to an interrupt mapping scheme comprising associations between the one or more processors and one or more of the plurality of interrupt identifiers;
   wherein the method comprises inserting the given kernel thread in a thread queue in the unique processor to which the worker kernel thread is bound;

determining that the given kernel thread is not awake nor in operation; and using the interrupt identifier to generate the interrupt.

9. The method of claim 8, wherein the method comprises assigning a priority to the given kernel thread, the priority indicating when the kernel thread is to be serviced in the thread queue.

10. The method of claim 8, wherein the method comprises:
identifying whether the given kernel thread is awake; and
waking up the given kernel thread if it is determined that the given kernel thread is not awake.

11. The method of claim 8, wherein the method comprises:
determining that the given kernel thread is awake and in operation; and
raising the interrupt immediately.

12. The method of claim 8, wherein the method comprises detecting an occurrence of an event that triggers an interrupt.

13. The method of claim 12, wherein the event that triggers an interrupt is an I/O completion.

14. The method of claim 8, wherein the method comprises detecting a total number of interrupt identifiers available in the system.

15. The method of claim 8, wherein the method comprises creating a kernel thread for handling an interrupt.

16. A computing apparatus, comprising:
one or more processors operable to run a plurality of kernel threads, a different one or ones of the kernel threads being awake and in operation at different times;
a memory coupled to the one or more processors, the memory storing a correspondence between a respective interrupt identifier of a plurality of interrupt identifiers and a given kernel thread of the plurality of kernel threads; and
an Input/Output (I/O) device coupled to the one or more processors and the memory, wherein upon occurrence of a triggering event, the I/O device identifies whether the given kernel thread is active, the I/O device being operable to raise an interrupt immediately when the given kernel thread is active, the I/O device being operable to use the respective interrupt identifier to generate the interrupt and bind the given kernel thread to a unique processor of the one or more processors when the given kernel thread is not active;
wherein the unique processor is associated with the respective interrupt identifier corresponding to the given kernel thread according to an interrupt mapping scheme of associations between the one or more processors and one or more of the plurality of interrupt identifiers.

* * * * *